(12) United States Patent
Junkers

(10) Patent No.: US 6,461,093 B1
(45) Date of Patent: Oct. 8, 2002

(54) THREADED FASTENER

(76) Inventor: John K. Junkers, 2543 Standish Ave., Union, NJ (US) 07083

( * ) Notice: Subject to any disclaimer, the term of this patent is extended or adjusted under 35 U.S.C. 154(b) by 0 days.

(21) Appl. No.: 09/655,530

(22) Filed: Sep. 5, 2000

(51) Int. Cl.[7] .............................. F16B 37/08
(52) U.S. Cl. ............................ 411/432; 411/533
(58) Field of Search ..................... 411/432, 533

(56) References Cited

U.S. PATENT DOCUMENTS

| | | | |
|---|---|---|---|
| 3,247,741 A | * | 4/1966 | Batten .................. 411/533 |
| 4,201,110 A | * | 5/1980 | Hanai |
| 4,715,756 A | * | 12/1987 | Danico |
| 4,951,974 A | * | 8/1990 | Schabert .............. 411/533 |
| 4,979,857 A | * | 12/1990 | Wing .................. 411/533 |
| 5,219,231 A | * | 6/1993 | Sheedy |
| 5,234,205 A | * | 8/1993 | Shanley |
| 5,341,560 A | | 8/1994 | Junkers |
| 5,580,201 A | * | 12/1996 | Brilmer |
| 5,640,749 A | | 6/1997 | Junkers |
| 6,095,733 A | * | 8/2000 | Busby .................. 411/533 |

FOREIGN PATENT DOCUMENTS

DE 3544423 * 6/1987 .................. 411/533

* cited by examiner

*Primary Examiner*—Flemming Saether
(74) *Attorney, Agent, or Firm*—Michael J. Striker

(57) ABSTRACT

A threaded fastener has a bolt; a nut including at least one sleeve in which the bolt is threadingly engaged, and a washer having a lower bearing surface adapted to bank on a surface of one of at least two elements to be connected with one another by the threaded fastener, the washer having a smooth inner surface and being press-fit with the smooth inner surface on a smooth outer surface of a part of the threaded fastener, so that when an active force and an opposite reactive force are applied to parts of the threaded fastener, the washer does not turn, while the bolt also does not turn but moves only in an axial direction.

2 Claims, 4 Drawing Sheets

THREADED FASTENER

BACKGROUND OF THE INVENTION

The present invention relates to threaded fasteners, such as bolts, nuts and the like.

Threaded fasteners are known which include a bolt and a nut which has at least one sleeve and a washer. Such fasteners are disclosed for example in my U.S. patent application Ser. No. 09/033,790, in my U.S. Pat. Nos. 5,341,560 and 5,640,749. There are three types of threaded fasteners. In the threaded fasteners of one type, the washer is connected to the inner sleeve of the two-sleeve nut via splines. In the other type the washer is spline-connected to the bolt. In the third type the washer is not connected to the inner sleeve, and the reaction force of the tool is applied simultaneously to the washer and to the inner sleeve, or to the washer and to the bolt head.

The connection of the washer via splines to the inner sleeves or to the bolt is expensive to manufacture since it requires an outer spline and an inner spline. Manufacturing of the nut when the washer is not connected to the inner sleeve or the bolt is less expensive, but has the disadvantage that the washer needs connecting means on the outside for the tool to apply a reaction force to it, which is also costly. In addition, the later needs two reaction drives, one for the inner sleeve or the bolt end and one for the washer, which also increases its cost relative to the other type where merely one action and reaction drive is needed.

SUMMARY OF THE INVENTION

Accordingly, it is an object of present invention to provide a threaded connection of the above mentioned general type which avoids the disadvantages of the prior art.

In keeping with these objects and with others which will become apparent hereinafter, one feature of the present invention resides, briefly stated in a threaded fastener which has a bolt, a nut including at least one sleeve in which said bolt is threadingly engaged, and a washer having a lower bearing surface adapted to bank on a surface of one of at least two elements to be connected with one another by the threaded fastener, said washer having a smooth inner surface and being press-fit with said smooth inner surface on a smooth outer surface of a part of the threaded fastener, so that when an active force and an opposite reactive force are applied to parts of the threaded fastener, said washer does not turn, while said bolt also does not turn but moves only in an axial direction.

When the threaded fastener is designed in accordance with the present invention, the washer has a round inner female opening, so that the washer can be pressed-fitted onto a round portion of the other part of the threaded connector, for example on the round portion of the inner sleeve or the round portion of the bolt. The manufacturing cost of the nut of the threaded connector in accordance with the present invention is 25% lower than the manufacturing cost for the threaded connector with the spline-connection and by about 15% lower than that of the nut that requires two reaction shafts, since the outer diameter of the washer can be round.

In the threaded connector which has a nut including an outer sleeve and an inner sleeve, the active force is applied to the outer sleeve, while the opposite reactive force can be applied either to the inner sleeve or to the outside of the washer so that in the later case the connecting means on the inner sleeve for the reactive drive is not needed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
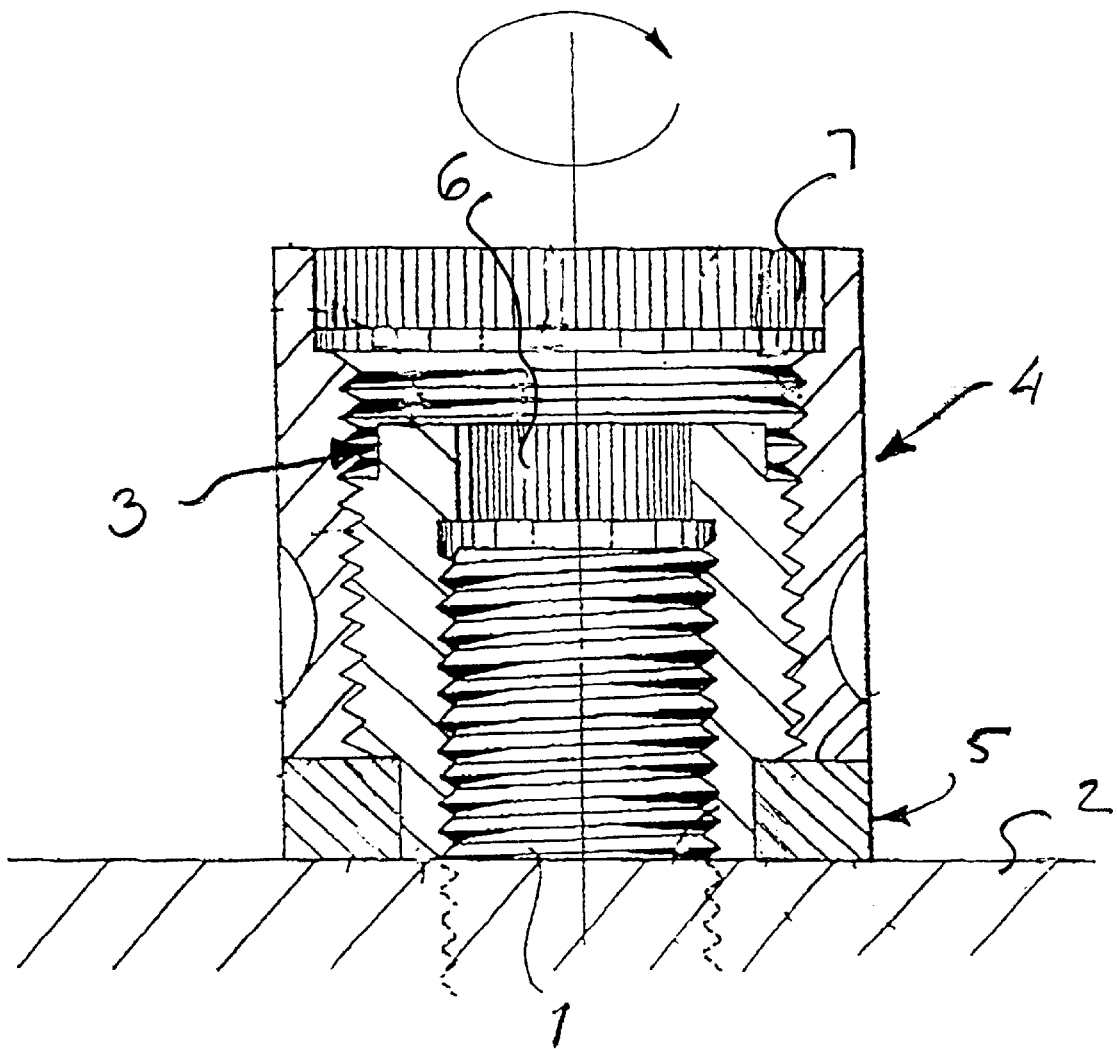
FIG. 1 is a view showing a threaded fastener in accordance with a first embodiment of the present invention.

A threaded fastener in accordance with the present invention has a bolt or a stud which is identified with reference numeral 1 and arranged in an outside object which is identified with reference numeral 2 and can be one element of a two-element assembly to be connected with one another by the threaded fastener. The threaded fastener further has a nut which includes an inner sleeve 3 and an outer sleeve 4. The inner sleeve 3 has an inner thread in which the bolt 1 is screwed and is movable only in an axial direction. The outer sleeve 4 has an inner thread which engages with an outer thread of the inner sleeve 3 and is turnable around an axis. The nut further has a washer which is identified with reference numeral 5. The outer sleeve 4 has a lower bearing face which abuts against an upper face of the washer 5, while the lower face of the washer 5 abuts against the element 2.

In the embodiment shown in FIG. 1 the inner sleeve 3 is provided with engaging formations 6 formed for example as inner splines provided in the inner opening of inner sleeve 3. The outer sleeve 4 also has engaging formations 7 formed for example as splines provided in an inner opening of the outer sleeve 4.

In accordance with the present invention, the washer 5 is pressed-fitted on the inner sleeve 3. In particular, the inner smooth round surface of the washer 5 is press-fitted on the outer smooth round surface of the inner sleeve 3, so that the washer does not turn relative to the inner sleeve 3, however the inner sleeve 3 can move relative to the washer 5 in an axial direction.

During the operation an active force is applied by a power tool through the engaging formations 7 of the outer sleeve 4 and a reactive force is applied through the engaging formation 6 to the inner sleeve 3, so that the outer sleeve 4 turns around the axis, the inner sleeve 3 which is non-rotabably connected with the washer 5 does not turn but instead is displaced in an axial direction, and as a result the bolt 1 is pulled by the inner sleeve 3 in the axial direction as well, so that the parts of the two-part assembly are tightened with one another.

Figure 2:
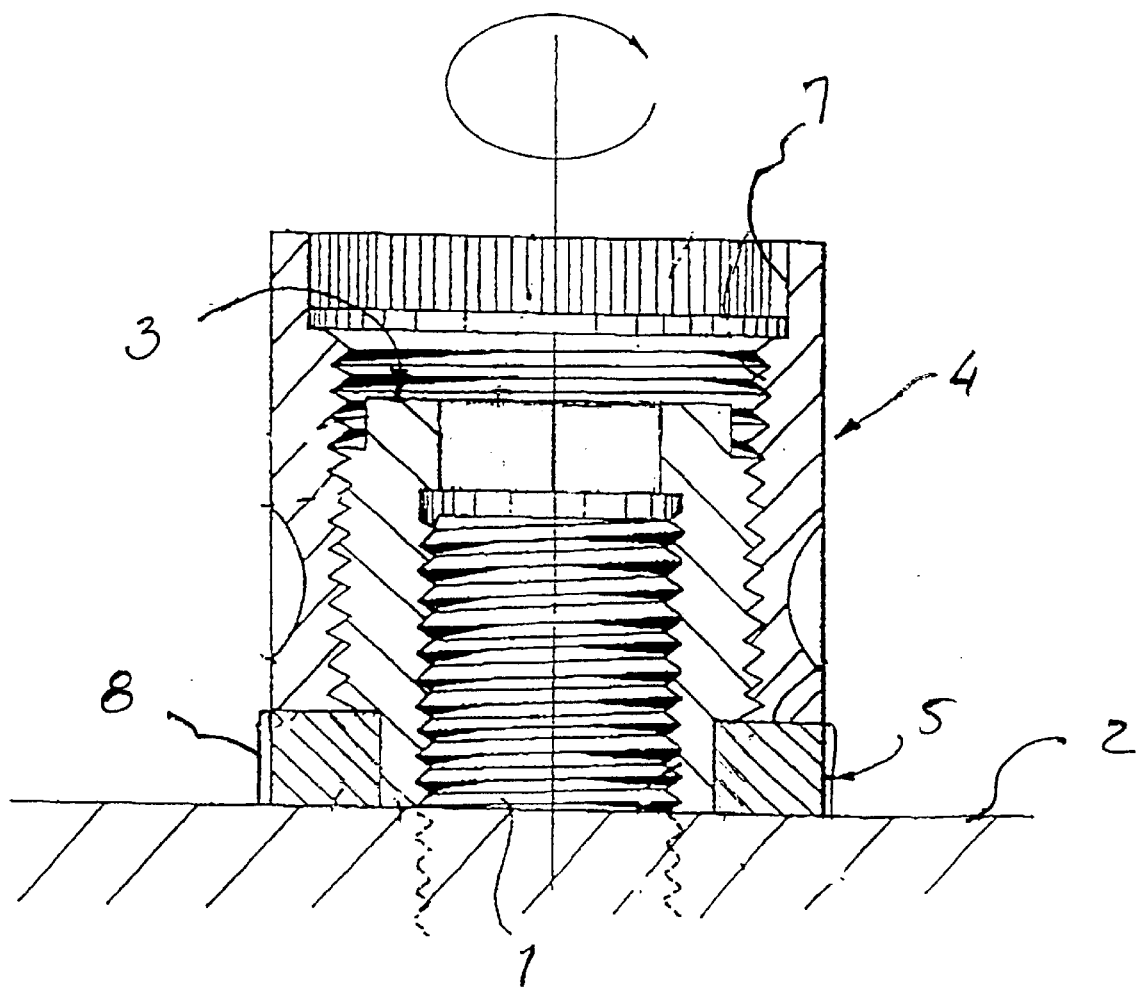
FIG. 2 is a view showing a threaded fastener in accordance with a second embodiment of the present invention.

In the embodiment shown in FIG. 2 the nut also has the inner sleeve 3, the outer sleeve 4 and the washer 5. Here however there is no engaging means on the inner sleeve 3, but instead the engaging means are provided on the washer 5. They can be formed for example as splines 8 on the outer surface of the washer 5.

During the operation when the active force is applied through engaging means 7 to the outer sleeve 4 and the reactive force is applied through the engaging means 8 by the power tool to the washer 5, the outer sleeve 4 is turned, the inner sleeve 3 which is non-rotatably connected with the washer 5 does not turn but instead is displaced in an axial direction, and the bolt 1 is also displaced in an axial direction so as to tighten the two-element assembly.

Figure 3:
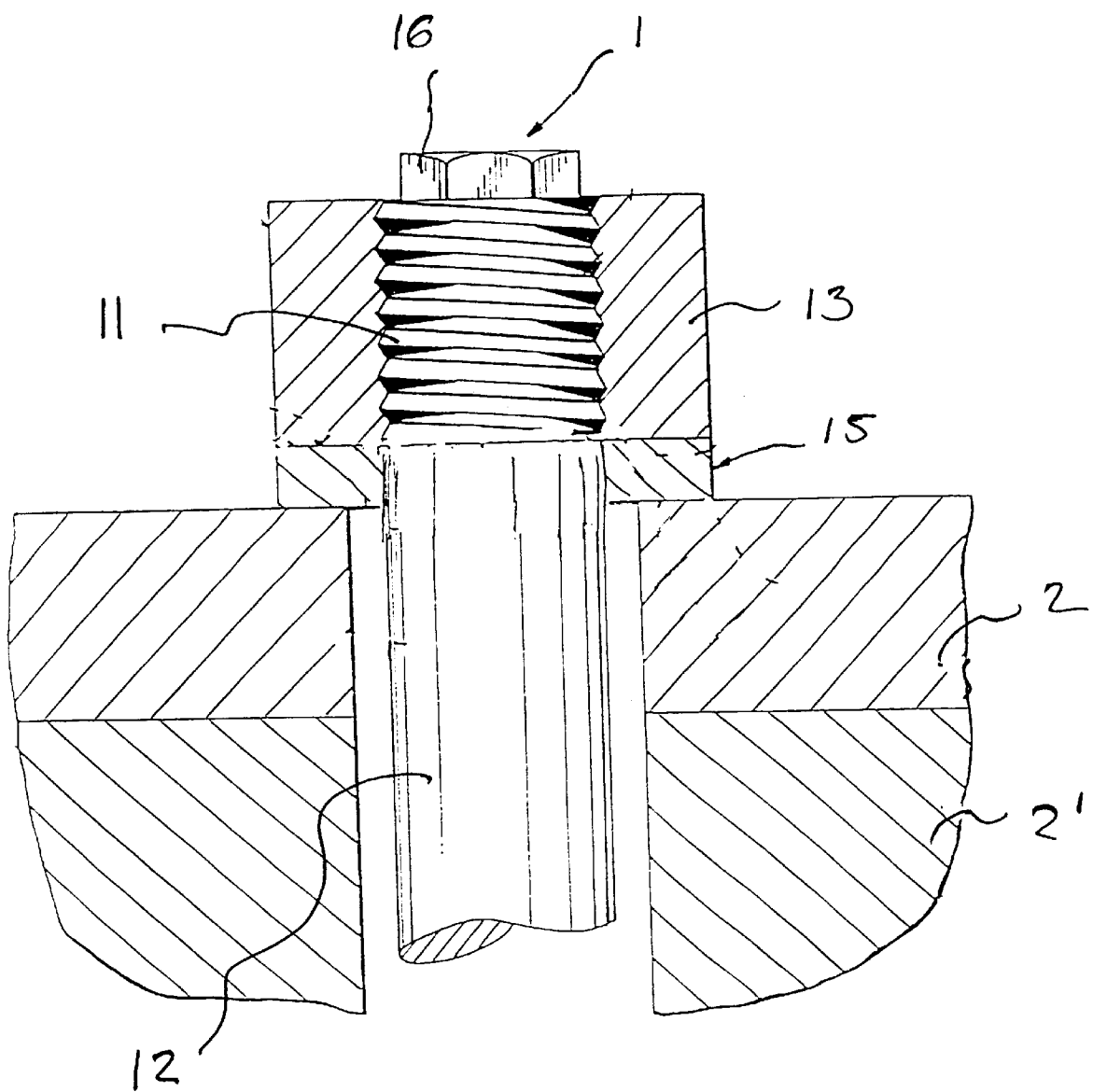
FIG. 3 is a view showing a threaded fastener in accordance with the a embodiment of present invention.

In the embodiment shown in FIG. 3 the nut includes only one sleeve 13 and a washer 15. The bolt 1 has a threaded portion 11 with an outer thread engaging with an inner thread of the sleeve 13, and a non-threaded round portion 12. In this embodiment the washer 15 is press-fitted on the non-threaded portion 12 of the bolt 1. More particularly, an inner smooth round surface of the washer 15 is press-fitted on the outer smooth round surface of the non-threaded portion 12 of the bolt 1. The bolt 1 is provided with an engaging formation 16 formed for example, as a polygonal head, while the sleeve 13 is also provided with an engaging formation formed, for example, as a polygonal outer surface.

During the operation when an active force is applied to the sleeve 13 through the engaging formation 17 and a reactive force is applied to the bolt 1 through the engaging formation 16, the sleeve 17 is turned, while the bolt 1 which is non-rotatably connected with the washer 15 does not turn but is displaced in an axial direction, so that in cooperation with its opposite end provided with a nut, the elements 2 and 2' are tightened together.

Figure 4:
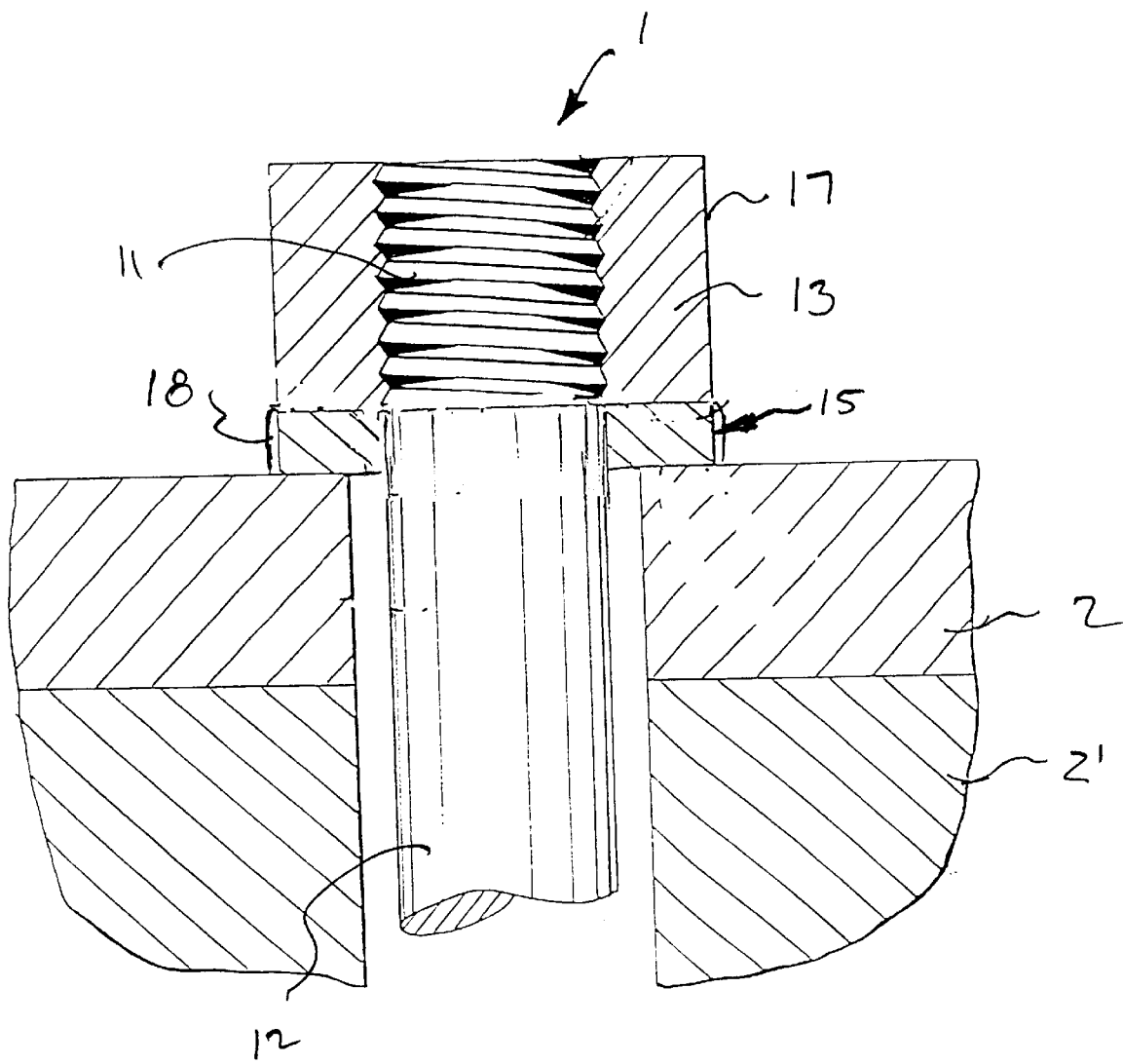
FIG. 4 is a view showing a threaded fastener in accordance with a fourth embodiment of the present invention.

The threaded connector of the embodiment shown in FIG. 4 is substantially similar to the embodiment shown in FIG. 3. However, here the bolt 1 does not have engaging means. Instead the second engaging means 18 are provided on the washer 15. The second engaging means can be formed by splines of the outer surface of the washer 15.

During the operation when the active force is applied to the outer sleeve 13 through the engaging formation 17 and the reactive force is applied to the washer 15 through the engaging formation 18, the sleeve 13 is turned around the axis, while the washer 15 remains stationary, and the bolt 1 which is non-rotatably connected with the washer 15 by the press-fit, does not rotate and instead is displaced in an axial direction so as to tighten the elements 2 and 2' of the two-element assembly.

It will be understood that each of the elements described above, or two or more together, may also find a useful application in other types of constructions differing from the types described above.

While the invention has been illustrated and described as embodied in threaded fastener, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A threaded fastener, comprising a bolt; a washer having a lower bearing surface adapted to bank on a surface of one of at least two elements to be connected with one another by the threaded fastener; and a nut including an inner sleeve in which said bolt is threadingly engaged and an outer sleeve which is threadably connected with said inner sleeve and has a face which banks on an upper bearing surface of said washer, said inner sleeve and said outer sleeve being provided with means for applying an active force and a relative force correspondingly, said washer having a smooth inner surface and being press fit with said smooth inner surface on a smooth outer surface of said inner sleeve, so that when the active force and the opposite reactive force are applied to said inner sleeve and to said outer sleeve correspondingly, said washer does not turn, while said bolt also does not turn but moves only in the axial direction.

2. A threaded fastener, comprising a bolt; a washer having a lower bearing surface adapted to bank on a surface of one of at least two elements to be connected with one another by the threaded fastener; and a nut including an inner sleeve in which said bolt is threadingly engaged and an outer sleeve which is threadably connected with said inner sleeve and has a face which banks on an upper bearing surface of said washer, said washer being press fit on said inner sleeve, so that when an active force and an opposite reactive force are applied to parts of the threaded fastener, said washer does not turn, while said bolt also does not turn but moves only in the axial direction.

* * * * *